(12) United States Patent
Riegel

(10) Patent No.: US 8,515,641 B2
(45) Date of Patent: Aug. 20, 2013

(54) METHOD AND SYSTEM FOR ASSISTING THE DRIVER OF A MOTOR VEHICLE IN IDENTIFYING SUITABLE PARKING SPACES FOR THE VEHICLE

(75) Inventor: Thilo Riegel, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 994 days.

(21) Appl. No.: 11/922,153

(22) PCT Filed: May 29, 2006

(86) PCT No.: PCT/EP2006/062661
§ 371 (c)(1),
(2), (4) Date: Sep. 30, 2009

(87) PCT Pub. No.: WO2007/006605
PCT Pub. Date: Jan. 18, 2007

(65) Prior Publication Data
US 2010/0017084 A1    Jan. 21, 2010

(30) Foreign Application Priority Data
Jul. 8, 2005  (DE) .......................... 10 2005 032 096

(51) Int. Cl.
*G06F 7/70* (2006.01)
*G05D 1/00* (2006.01)
*B60T 8/1755* (2006.01)

(52) U.S. Cl.
CPC .................................. *B60T 8/1755* (2013.01)
USPC ................................................ 701/70; 701/1

(58) Field of Classification Search
USPC ....................................................... 701/1, 70
See application file for complete search history.

(56) References Cited

U.S. PATENT DOCUMENTS

| | | | |
|---|---|---|---|
| 4,931,930 A | 6/1990 | Shyu et al. | |
| 5,400,864 A * | 3/1995 | Winner et al. | 180/169 |
| 6,097,314 A | 8/2000 | Desens et al. | |
| 6,163,755 A * | 12/2000 | Peer et al. | 701/301 |
| 6,259,980 B1 * | 7/2001 | Peck et al. | 701/24 |
| 6,265,968 B1 | 7/2001 | Betzitza et al. | |
| 6,446,998 B1 * | 9/2002 | Koenig et al. | 280/432 |
| 6,526,335 B1 * | 2/2003 | Treyz et al. | 701/1 |

(Continued)

FOREIGN PATENT DOCUMENTS

| | | |
|---|---|---|
| DE | 3813083 | 11/1989 |
| DE | 19703517 | 8/1998 |

(Continued)

OTHER PUBLICATIONS

International Search Report, PCT International Patent Application No. PCT/EP2006/062661 dated Aug. 28, 2006.

*Primary Examiner* — James P Trammell
*Assistant Examiner* — Daniel L Greene
(74) *Attorney, Agent, or Firm* — Kenyon & Kenyon LLP

(57) ABSTRACT

A method for assisting the driver of a vehicle in detecting suitable parking spaces for the vehicle, a measuring unit detecting potential parking spaces as the vehicle passes by and the length and/or depth or width of a detected parking space being ascertained. A detected parking space is evaluated as a function of the ascertained length and/or depth regarding the possibility of parking the vehicle in this parking space, and the drive and/or braking device of the vehicle is controlled or regulated in such a way that the vehicle is automatically braked if the evaluation of a detected parking space yields the result that the vehicle can be parked in this parking space.

11 Claims, 2 Drawing Sheets

(56) References Cited

U.S. PATENT DOCUMENTS

| | | |
|---|---|---|
| 6,906,640 B2 | 6/2005 | Gotzig et al. |
| 7,089,101 B2 | 8/2006 | Fischer et al. |
| 2005/0236201 A1 | 10/2005 | Spannheimer et al. |
| 2006/0139181 A1 | 6/2006 | Danz et al. |

FOREIGN PATENT DOCUMENTS

| | | |
|---|---|---|
| DE | 10220426 | 11/2003 |
| DE | 10223269 | 12/2003 |
| DE | 10232295 | 2/2004 |
| DE | 10256770 | 6/2004 |
| DE | 10258310 | 6/2004 |
| DE | 10257722 | 7/2004 |
| DE | 10320723 | 11/2004 |
| EP | 1298451 | 4/2003 |

* cited by examiner

METHOD AND SYSTEM FOR ASSISTING THE DRIVER OF A MOTOR VEHICLE IN IDENTIFYING SUITABLE PARKING SPACES FOR THE VEHICLE

FIELD OF THE INVENTION

The present invention relates to a method for assisting the driver of a vehicle in identifying suitable parking spaces for the vehicle, a measuring unit detecting potential parking spaces as the vehicle passes by and ascertaining the length and/or depth or width of a detected parking space.

BACKGROUND INFORMATION

The increase in traffic density and more and more construction taking up free areas are reducing the traffic space continuously, in particular in densely populated areas. Available parking spaces are becoming scarcer, and the search for suitable parking spaces puts a stress on the driver in addition to the constantly increasing traffic. In particular in backing into a parking space, correctly estimating the exact size and position of the parking space is often associated with considerable difficulties. Some drivers are often unsure whether their vehicle fits into a parking space that they have found, which is formed between stationary vehicles or other obstacles.

Conventionally, different devices and systems are used for unburdening the driver of a vehicle when parking. For example, parking pilots for distance detection of the objects delimiting the parking space in the front and back area of the vehicle (PDC=Park Distance Control), parking space measuring systems (PSM), and semi-autonomous or fully autonomous parking assistants have been proposed.

Multiple methods and systems for assisting the driver in ascertaining suitable parking spaces with the aid of parking space measurement are described, for example, in German Patent Application Nos. DE 102 58 310 A1, DE 103 20 723 A1, and DE 102 57 722 A1. In a parking sequence, the first important task for the driver is to estimate whether the length and depth, i.e., width, of a potential parking space is sufficiently large for parking the vehicle and whether it is thus possible to safely park the vehicle in this parking space. To facilitate this estimate, a parking space measuring system (PSM) is used, which measures the parking space dimensions between two parked vehicles. For this purpose, when driving by a potential parking space, contactless distance sensors which may preferably be formed by ultrasonic sensors, but also by infrared or radar sensors, for example, first detect a first stationary obstacle; then detect, over a certain stretch, an at least essentially obstacle-free potential parking space, and then a second stationary obstacle. The length and/or depth of the space thus measured and/or information derived therefrom regarding whether his vehicle fits into this space between the obstacles may then be output to the driver.

German Patent Application No. DE 197 03 517 A1 describes a method and a device for assisting the driver in parking in a parking space after it has been measured. For this purpose, the required control interventions may be either displayed to the driver or also performed automatically as a parking assistant (PSC=Park Steering Control). The start of the parking sequence does not start until the driver has input an appropriate confirmation signal. It is further known to start parking immediately following the measurement or to start parking when a conclusion regarding a parking intent of the driver may be drawn on the basis of the driving conditions of the vehicle, which may be derived, for example, from the driver having stopped the vehicle.

Furthermore, German Patent No. DE 38 13 083 A1 describes an automatic parking device for motor vehicles in which potential parking spaces are measured when driving by and a signal is generated if a parking space is sufficiently large for parking. Also in this case, signals may be generated for performing the parking, these signals either being displayed in a display device to show the driver instructions for the required parking motions or controlling the drive mechanisms of the vehicle with the aid of control devices to achieve the necessary driving action. Regarding the start of the parking sequence, it is provided that the data for controlling the vehicle may contain a stop point at which the forward motion of the vehicle is stopped and the reverse motion of the parking sequence begins.

In conventional methods and systems of assistance in searching for a suitable parking space, the driver, however, still has to perform certain actions himself, which are associated with some difficulties. In particular, the driver must be active to stop the vehicle to enable the start of an assisted parking sequence. This creates difficulties, since on the one hand he must respond quickly in order not to be forced to back up too far. On the other hand, he must brake using sufficient care in order not to cause being back-ended by the vehicle following behind.

In addition, the driver himself must be careful not to exceed a maximum speed predefined by the system, since a safe and error-free detection and measurement of a parking space is not ensured above this speed. This is also due, among other things, to the physical limitations of the normally used ultrasonic sensors which provide reliable information about suitable parking spaces without problems only at a maximum speed of approximately 20 km/h or at corresponding maximum speeds for other sensor types. The driver must also constantly pay attention not to exceed the maximum speed supported by the system, which may furthermore depend on environmental conditions such as, for example, weather, wetness, ambient noise, and/or surrounding construction, if he wishes to avoid passing by suitable parking spaces without using them or parking spaces being erroneously signaled as suitable. This is very difficult over longer distances, particularly at low speeds.

Stronger support for the driver would therefore be desirable in looking for suitable parking spaces.

SUMMARY

An object of the present invention is to provide an improved method, i.e., a driver assistance system of the above-mentioned type, which would strongly support the driver in detecting suitable parking spaces for the vehicle and reduce or even avoid difficulties in finding suitable parking spaces.

Compared to conventional methods and systems, an example method of the present invention may have the advantage that the driver no longer needs to initiate the braking of the vehicle himself.

A detected parking space is evaluated as a function of the ascertained length and/or depth with a view as to whether parking the vehicle into this parking space is possible, and the vehicle, in particular the drive and/or braking device of the vehicle, are controlled or regulated with the aid of a control and/or regulating unit in such a way that the vehicle is automatically braked if the evaluation of a detected parking space yields the result that the vehicle may be parked into this parking space. After detecting a parking space having sufficient length, and preferably also depth or width, the speed of the vehicle is automatically reduced and the braking signals to the driver that a suitable parking space has been found.

The advantages are manifested in particular in the driver being unburdened, since he no longer has to initiate braking himself after being given a signal regarding a suitable parking space. This means that the driver is able to concentrate more on the traffic than on the signaling of a suitable parking space, which contributes to greater traffic safety. By initiating automatic braking of the vehicle, the path and/or the time within which the vehicle may be brought to a full standstill after the automatic start of a braking sequence by the driver or by the system may also be shortened.

It may be particularly advantageous if the vehicle is braked to a standstill automatically. In this case, the driver does not need to intervene in the braking at all, but after the vehicle has been brought to a standstill he must still decide whether he actually wishes to use the parking space estimated as suitable for parking, in which case parking may be performed without problems without further support by a system or, for example, with extensive support by a parking assistant. Basically, the advantages of the method according to the present invention may be used even when the vehicle is braked only to somewhat reduce the speed, rather than to a complete standstill.

Braking that is particularly comfortable for the vehicle's occupants may be achieved by reducing the speed of the vehicle according to a predefined speed curve. This speed curve may be fixedly preprogrammed or different braking profiles may be provided from which the driver may select a desired profile.

It is furthermore advantageous in particular if the distance to possible following vehicles and/or preceding vehicles or obstacles is detected and braking is performed as a function of a possibly detected distance. The function is preferably configured in such a way that the smaller a detected distance to a following vehicle and/or the greater a detected distance to the preceding vehicle, the less intensely the vehicle is braked, and the greater a detected distance to a following vehicle and/or the smaller a detected distance to a preceding vehicle or to an obstacle located in front of the vehicle, the more intensely the vehicle is braked. In this way, when an obstacle is detected in front of the vehicle, an imminent collision may be prevented or an impact may be minimized by intensifying the braking. Maximum braking may be initiated or performed in particular if no following vehicle is detected. To perform braking as a function of the detected distances, the example method according to the present invention or an appropriate example system is preferably linked to ACC (=Adaptive Cruise Control), ACC-FSR (=Adaptive Cruise Control Full Speed Range), or ACC-stop-and-go or another predictive safety system.

According to a particularly preferred specific embodiment of the method according to the present invention, it is provided that the drive of the vehicle is controlled in such a way that the vehicle is accelerated after automatic braking as soon as there is an acceleration signal to be input by the driver. The vehicle is then preferably accelerated to the speed at which it was driven immediately before automatic braking was initiated. The acceleration signal may be output, for example, by operating a button and/or by operating the gas pedal. In this way the driver may switch back to search mode in a particularly easy way and continue the search for another suitable parking space.

Compared to conventional methods and systems, an example method according to the present invention may have the advantage that the driver is strongly supported in that he no longer needs to monitor the observance of the maximum allowable speed for safely finding a suitable parking space during the search.

In accordance with the present invention, the vehicle, in particular the drive and/or braking device of the vehicle, are controlled or regulated with the aid of a control and/or regulating unit in such a way that a parking space search speed of the vehicle is kept constant automatically and the driver is given information about a detected parking space. This information may be, for example, the output of a certain signal or the display of a quantified length specification of a detected parking space. Evaluating the possibilities of parking is not necessary in this case.

The advantages are also in this case if the driver is unburdened because he no longer has to pay attention to the fact that the maximum allowable parking space search speed predefined or ascertained by the system is not exceeded. It is thus automatically ensured that parking spaces are safely detected and the possibility of errors occurring in measuring a detected parking space due to excess speed is minimized. This means again that the driver is able to concentrate more on the traffic than on the observance of a certain maximum speed, which in turn contributes to greater traffic safety.

It may be advantageous in particular if the parking space search speed of the vehicle is set automatically as soon as the driver has input or operated an appropriate start signal. The driver is then unburdened not only of monitoring the observance of, but also of achieving, the allowable maximum speed. The vehicle may then be regulated to a parking space search speed which has been ascertained by the system as suitable; it may be a function of environmental influences such as weather, wetness, and/or ambient noise in particular.

The maximum possible speed at which suitable parking spaces may still be detected reliably and as much as possible error-free is preferably selected as the parking space search speed. However, according to the present invention it may also be provided that the parking space search speed be optionally predefined or selected by the driver. The driver may select, for example, a sportier or a rather comfortable or advantageously a lower parking space search speed if he wishes to have more reliability in detecting suitable parking spaces. The speed may be set either continuously or graduated in three steps in particular.

It is also advantageous in particular if the distance to any preceding vehicles or to obstacles in front of the vehicle is detected and the parking space search speed is reduced if the distance drops below a certain minimum distance. For example, if there is a slower object in front of the vehicle, the parking space search speed may be reduced and adapted accordingly. For this purpose, the method or a corresponding system may advantageously have a front sensor and/or cooperate with or be linked to an ACC, ACC-FSR, ACC-stop-and-go, or another predictive safety system, whereby also standstill phases may be bridged without interrupting the method or without a corresponding system shutting down.

Although evaluation of the detected parking spaces for suitability for parking is not absolutely necessary in this case, it is proposed as an advantageous embodiment of the method according to the present invention that also in this case a detected parking space be evaluated regarding whether the vehicle can be parked in this detected parking space taking into consideration the vehicle's dimensions and as a function of the ascertained length and/or depth [of the parking space], the driver being given a signal only if the vehicle is able to park in the parking space thus detected. It is advantageous in particular if the evaluation is done in three stages as good, bad or altogether impossible, and accordingly, for example, a green or yellow or red signal may be visually displayed According to a particularly preferred specific embodiment of the present invention, it may be provided that the drive of the vehicle be controlled or regulated in such a way that the vehicle is automatically braked if the evaluation of a detected parking space yields the result that the vehicle may be parked in this parking space, and is also controlled or regulated in such a way that a parking space search speed of the vehicle is automatically kept constant or is regulated. In this case the driver receives information about a detected parking space by a braking sequence of the vehicle being automatically initiated. In this way particularly good and varied assistance to the driver is ensured, since he himself does not have to concentrate either on observing a not excessively high suitable speed or on quickly yet safely braking the vehicle. Of course, all of the previously described advantageous refinements of the method according to the present invention may be used for maximum assistance to the driver.

The present invention also relates to a system which is suitable for carrying out the method according to the present invention.

A system corresponding to the previously described method for assisting the driver of a vehicle in identifying suitable parking spaces for the vehicle preferably includes a measuring device for detecting and measuring potential parking spaces, an evaluation unit for evaluating a detected parking space, and a control or regulating unit for controlling or regulating the drive of a vehicle.

If the vehicle is automatically decelerated for parking in a parking space, it is also advantageous if appropriate visual signals of the vehicle are triggered. In a first specific embodiment, a braking light is thus automatically triggered with braking. In another supplementary or alternative specific embodiment, a directional light, a so-called blinker, is triggered on the vehicle side on which a suitable parking space has been detected. The driver thus does not need to additionally operate the directional light of the vehicle to indicate his intent to park.

BRIEF DESCRIPTION OF THE DRAWINGS

Exemplary embodiments of the present invention are illustrated in the figures and are explained in greater detail below.

DETAILED DESCRIPTION OF EXAMPLE EMBODIMENTS

Figure 1:
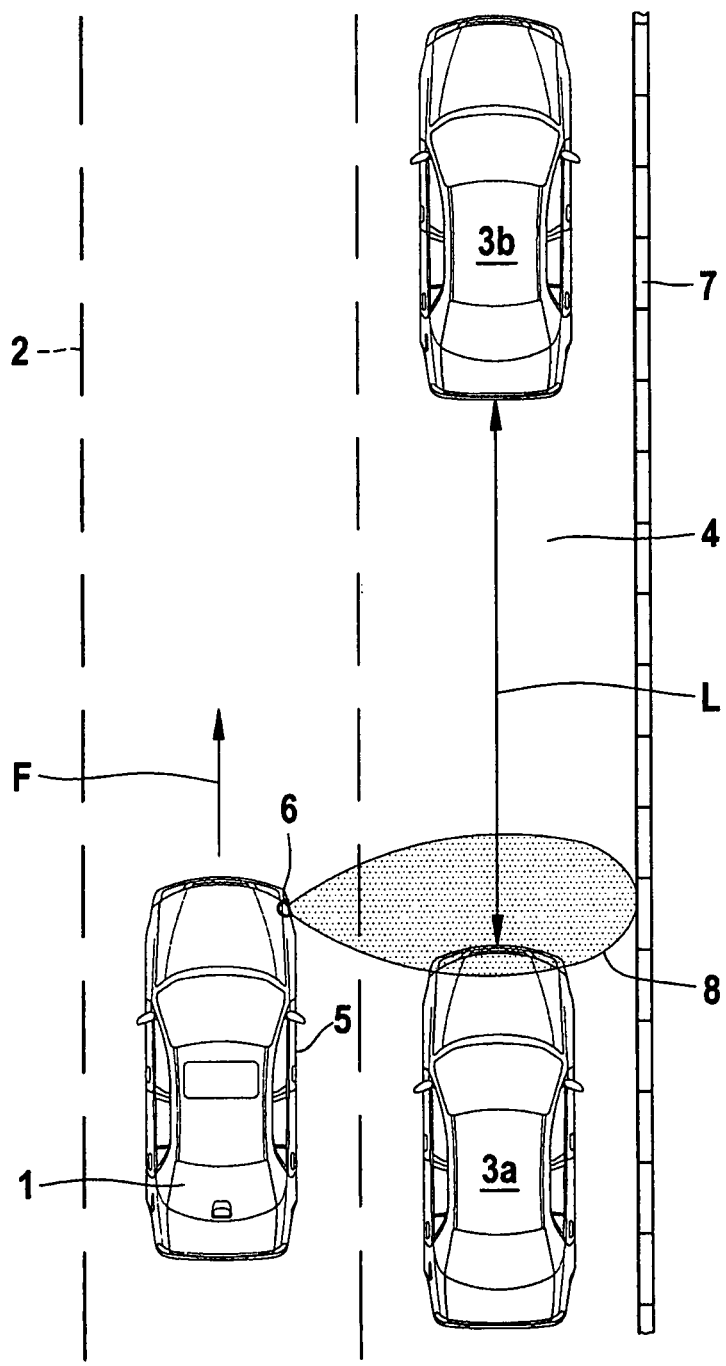
FIG. 1 schematically shows a vehicle in top view as it passes by a parking space.

The example method according to the present invention and the example system according to the present invention are used in particular in motor vehicles. FIG. 1 shows a motor vehicle 1, which moves on a road 2 in a driving direction F illustrated by an arrow. There is a parking space 4, whose length is schematically indicated by arrow L, between a first vehicle 3a parked at the edge of the road and a second vehicle 3b. A distance sensor 6 which is used as a measuring unit for measuring the distance between right side 5 of the vehicle and objects 3a, 3b, and 7 delimiting the parking space is situated on the right side 5 of motor vehicle 1. Distance sensor 6 is advantageously designed here as an ultrasonic sensor which emits an ultrasonic signal and again receives the reflected ultrasonic signal. A distance of motor vehicle 1 to obstacles next to motor vehicle 1, for example, to curb 7, may be ascertained from the propagation time of the ultrasonic signal. Instead of ultrasonic sensors, other sensors may, however, also be used which emit other wave signals, in particular infrared waves or electromagnetic waves, for example, radar waves.

Figure 2:
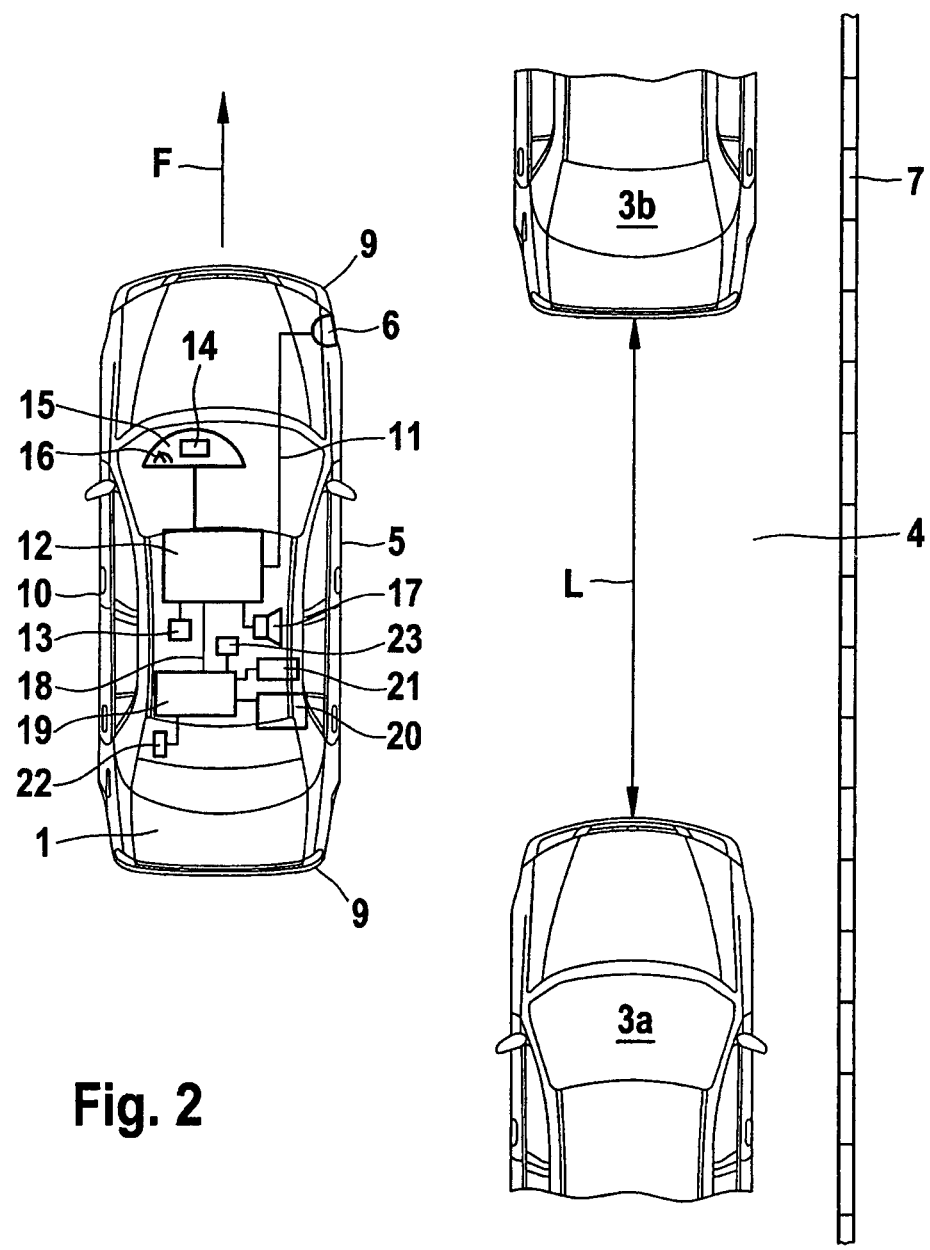
FIG. 2 schematically shows a system according to the present invention in the vehicle of FIG. 1.

In the given exemplary embodiment, only one distance sensor 6 is provided, which emits a beam cone 8 approximately at a right angle to right side 5 of the vehicle. However, two or more distance sensors may also be provided on motor vehicle 1 to increase the measuring accuracy. In addition to or instead of distance sensor 6 shown in FIGS. 1 and 2, other distance sensors may also be used which are not illustrated here, and which are mounted on vehicle corners 9 in particular in such a way that their beam cones are inclined approximately 45° forward and/or backward with respect to right side 5 of the vehicle. Further distance sensors, which, however, are not graphically illustrated here, may additionally be situated on left side 10 of the vehicle for parking on that side.

Distance sensor 6 is connected to an evaluation unit 12 via data lines 11. When motor vehicle 1 passes by parking space 4, evaluation unit 12 registers the measuring data detected by distance sensor 6 and assigns them to a particular position of motor vehicle 1 with the aid of distance signals. The distance signals are transmitted from a distance sensor 13, for example, a wheel speed sensor, to evaluation unit 12.

The information about a suitable parking space 4 ascertained and evaluated by evaluation unit 12 is output to the driver via a visual output unit 14, which is here integrated into a combined instrument 15 which delivers a variety of additional information, for example, scale display 16 for driving speed and/or for tank filling status. Additionally, evaluation unit 12 is also connected to a speaker 17, via which information about a detected parking space 4 may also be output acoustically.

Evaluation unit 12 is connected to a control and regulating unit 19 via a data line 18; the control and regulating unit is able to control drive 20 and a braking device 21 of motor vehicle 1. In addition, control and regulating unit 19 is connected to a button 22, which the driver may operate for first-time or renewed start of a parking space search. In addition, control and regulating unit 19 is connected to a speed sensor 23, via which it receives information about the instantaneous driving speed of motor vehicle 1. In an additional specific embodiment, control and regulating unit 19 also controls a light indicator of the vehicle, in particular a blinker on the vehicle side where parking is to take place.

The operation of the above-described system for carrying out the method according to the present invention is described below.

After button 22 has been actuated, control and regulating unit 19 regulates drive 20 and braking means 21 in such a way that motor vehicle 1 is brought to a maximum allowable parking space search speed and this speed is kept constant. Motor vehicle 1 passes by potential parking spaces 4, which, after being measured, are evaluated in evaluation unit 12 regarding whether parking is possible as a function of ascertained length L of parking space 4 and the known vehicle data, in particular the vehicle length and the vehicle turning radius. If parking may take place, the driver is shown a symbol in output unit 14 signaling that a suitable parking space 4 has been found. At the same time, control and regulating unit 19 receives a signal for controlling drive 20 and braking means 21 in such a way that a quick, but still safe and comfortable braking of motor vehicle 1 to a standstill is performed. According to the other specific embodiment, the braking light is activated by the deceleration and the blinker is set on the vehicle side in the direction of the parking space.

If the driver does not wish to use parking space 4 which has been detected and evaluated as suitable for parking, for example, because there are minor obstacles in it which have not been detected, he may continue the parking space search as described above by actuating button 22 again.

What is claimed is:

1. A method for assisting a driver of a vehicle in detecting a suitable parking space for the vehicle, the method comprising:
    detecting potential parking spaces by a measuring unit as the vehicle passes by;
    ascertaining at least one of a length and depth of a detected parking space;
    evaluating the detected parking space as a function of the at least one of the ascertained length and depth regarding whether parking the vehicle into this detected parking space is possible; and
    controlling or regulating at least one of a drive and a braking device of the vehicle so that the vehicle is automatically braked if the evaluation of a detected parking space yields a result that the vehicle can be parked in the detected parking space.

2. The method as recited in claim 1, wherein the vehicle is braked to a standstill.

3. The method as recited in claim 1, wherein braking is performed so that a speed of the vehicle is reduced according to a predefined speed curve.

4. The method as recited in claim 1, further comprising:
    detecting a distance to at least one of a following vehicle and a preceding vehicle, braking being performed as a function of the detected distance, wherein:
        the vehicle is braked more intensively at least one of in an event of a greater distance to the following vehicle, and in an event of a smaller distance to the preceding vehicle; and
        the vehicle is less intensively braked at least one of in an event of a smaller distance to the following vehicle and in an event of a greater distance to the preceding vehicle.

5. The method as recited in claim 1, wherein the drive of the vehicle is controlled in such a way that after automatic braking, the vehicle is accelerated again if there is an acceleration signal to be input by the driver, the acceleration being performed automatically to a speed recorded as having prevailed immediately before the automatic braking was initiated.

6. A method for assisting the driver of a vehicle in detecting suitable parking spaces for the vehicle, comprising:
    detecting potential parking spaces by a measuring unit as the vehicle passes by;
    ascertaining at least one of a length and depth of a detected parking space;
    evaluating the detected parking space as a function of the at least one of the ascertained length and depth regarding whether parking the vehicle into this detected parking space is possible;
    controlling or regulating at least one of a drive and a braking device of the vehicle so that the vehicle is automatically braked if the evaluation of a detected parking space yields a result that the vehicle can be parked in the detected parking space; and
    controlling at least one of a drive and a braking device of the vehicle so that a parking space search speed of the vehicle is automatically kept constant and information is given to the driver about a detected parking space.

7. The method as recited in claim 6, wherein the parking space search speed of the vehicle is set automatically if there is a start signal to be input by the driver.

8. The method as recited in claim 6, wherein the parking space search speed is predefined.

9. The method as recited in claim 6, wherein a distance to possible preceding vehicles or to obstacles in front of the vehicle is detected and the parking space search speed is reduced if the distance drops below a certain minimum distance.

10. The method as recited in claim 6, wherein a detected parking space is evaluated as a function of the at least one of the ascertained length and depth regarding whether and how parking the vehicle in this detected parking space is possible, and information about a result of the evaluation of the parking space is output in an output unit.

11. A system for assisting a driver of a vehicle in detecting a suitable parking space for the vehicle, comprising:
    a measuring device adapted to measure at least one of a length and a depth of potential parking spaces as the vehicle passes by;
    an evaluation unit adapted to evaluate the suitability of a detected parking space for the vehicle; and
    a control or regulating unit adapted to control or regulate at least one of a drive and a braking device of the vehicle as a function of the evaluation.

* * * * *

UNITED STATES PATENT AND TRADEMARK OFFICE
CERTIFICATE OF CORRECTION

PATENT NO.       : 8,515,641 B2                                                                 Page 1 of 1
APPLICATION NO. : 11/922153
DATED            : August 20, 2013
INVENTOR(S)      : Thilo Riegel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1627 days.

Signed and Sealed this

Fifteenth Day of September, 2015

Michelle K. Lee
*Director of the United States Patent and Trademark Office*